Patented Nov. 19, 1940

2,221,779

UNITED STATES PATENT OFFICE 2,221,779

ACID-RESISTANT RESIN PRODUCT

William R. Collings, Richard D. Freeman and Richard M. Upright, Midland, Mich., assignors to The Dow Chemical Company, Midland, Mich., a corporation of Michigan No Drawing. Application February 25, 1938,
Serial No. 192,501

9 Claims. (Cl. 260—10)

This invention concerns a new acid-resistant thermo-setting resin material, the preparation thereof, and products molded therefrom.

Many methods have been proposed for the preparation of thermo-setting resins from carbohydrate and lignin-containing materials, phenols, and aldehydic bodies. United States Patent No. 1,886,353 suggests the decomposition of ligno-cellulosic materials with phenol in the presence of inorganic acids and the subsequent reaction of the digestion product with aldehydic bodies. United States Patent No. 1,593,343 describes the formation of resins by the digestion of carbohydrates, such as starch and sugars, with acid and phenol to split out water and form a monose-phenolic complex which is subsequently reacted with aldehyde. Each of the above processes employs a large excess of substantially water-free phenol in the digestion step, unreacted portions thereof being subsequently recovered by vacuum distillation.

A resin composition prepared by the partial digestion of ligno-cellulosic material with aqueous ammonium phenolate is disclosed in United States Patent No. 1,892,409. According to this method, wood chips or the like are treated with dilute aqueous ammonium phenolate at elevated temperature and pressure until a portion of the ligno-cellulosic material is dissolved in the treating liquor. Aldehyde is then added to the mixture, the liquid phase separated from solid constituents of the reaction mixture, and the solid remainder molded at elevated temperatures and high pressures.

Plastic articles molded from the materials obtained in certain of the above processes have been found to hydrolyze and decompose upon continued exposure to the action of water and acids such as sulphuric acid. Others of these plastics have a highly phenolic odor, and are subject to charring and discoloration at elevated temperatures. Furthermore, the relatively long period during which high temperatures and pressure must be employed in the molding of certain of the above products frequently results in plastic articles which are deficient in mechanical strength. An additional property of some of the above compositions which limits the scope of their application is the fact that they are relatively soluble in organic solvents and particularly alcohol. This precludes their use in the preparation of molded articles liable to be exposed to such solvents.

Among the objects of this invention is to provide a phenolate-aldehyde-ligno-cellulosic resin which after molding will not have the undesirable characteristics outlined above, and which will be substantially odorless; insoluble in alcohol; resistant to decomposition and hydrolysis upon prolonged exposure to water and to acids such as sulphuric; non-corrosive to metals and adapted to be conveniently and permanently bonded thereto; and difficultly flammable and of good heat resistance, thereby being adapted for use in articles subject to elevated temperatures without burning, charring, discoloring, or embrittlement. A further object is to provide a method for the preparation of useful resins from ligno-cellulosic materials which will not require the use of an excess of phenol, and will result in a molding material adapted to be fabricated more expeditiously than are related resin products.

We have discovered that a water-insoluble thermo-setting resin material can be prepared according to the hereinafter described procedure in which the principal steps are: (1) digesting a ligno-cellulosic material with a hot aqueous solution comprising inorganic alkali and a substantial proportion of a water-soluble metal salt of a phenol until the cellulose content of the ligno-cellulosic body is substantially completely dissolved in the treating fluid, (2) condensing an aldehyde with the digestion product, (3) acidifying the resulting liquid, and (4) separating the thermo-setting material so produced.

According to the invention, the process is carried out by heating ligno-cellulosic material in a solution of an alkali and a phenolate at a temperature between 150° C. and the decomposition temperature of the mixture, and preferably between 170° and 180° C. The mixture is preferably agitated while heating under the vapor pressure of the reactants at the temperature used. After the cellulose content of the ligno-cellulosic material is substantially completely dissolved in the treating liquor, the reaction mixture is preferably cooled, generally to a temperature between 50° and 80° C., and an aldehyde added thereto. The reaction mixture is then thoroughly agitated and maintained at a temperature below 150° C. for a period of time required to cause condensation and produce a resin material having the properties desired, but insufficient to cause precipitation of the condensation product from solution. Following completion of the aldehyde condensation step, the temperature of the reaction solution is adjusted to between 20° and 40° and the solution acidified to precipitate the thermo-setting material. The precipitated product is separated by any suitable means, e. g. filtration or decantation, and washed with water or dilute aqueous alkaline solution to remove salt and acid residues therefrom. The moist resin material is dried at temperatures below 100° C. for a period of time sufficient to reduce the moisture content thereof to below 8 per cent, but insufficient to cause material alteration in the flow characteristics of the product. This dried resin intermediate is then adapted for use in the preparation of a variety of molded products.

Various modifications may be made in the procedure described in the foregoing paragraph. For example, the inorganic alkali may be neutralized before adding the aldehyde to the digestion product. Following the aldehyde condensation step, the acidification of the reaction product may be carried out by pouring such product into an acid solution, in which case the resin is precipitated in a finely divided amorphous form. An alternate procedure consists in adding the acid to the condensation reaction product, whereby the resin is precipitated in the form of spongy aggregates.

In carrying out the foregoing procedure, at least 0.01 pound mole of a water-soluble metal salt of a phenol is required for each pound of ligno-cellulosic material to be digested, and amounts thereof up to 0.02 pound mole per pound of ligno-cellulosic material or higher may be employed. Sufficient water is used in the treating liquor to form a solution containing from about 12 to 25 per cent by weight of the phenolate. The inorganic alkaline constituent of the mixture is preferably in an amount equivalent to at least 0.015 pound mole and not in excess of 0.02 pound mole per pound of oven-dried wood or other lignocellulosic product to be digested. The concentration of such alkali is preferably not in excess of 15 per cent by weight of the treating solution. The quantity of aldehyde required is equal to at least 1.25 molar equivalents for each mole of phenolate employed. 2.0 to 2.5 equivalents of aldehyde for each equivalent of phenolate has been found particularly satisfactory. If the inorganic alkali employed in the digestion step is not neutralized prior to the addition of aldehyde, greater amounts of aldehyde may be required in the condensation step to obtain optimum yields, due to the reaction of aldehyde with such alkali.

Woods, such as aspen, birch, maple, basswood, poplar, white pine, and the like, and such lignocellulosic agricultural products as cornstalks, wheat straw, and dried grasses may be employed in the process. Such material may be in any suitable state of subdivision, e. g. chips, sawdust, shreds. finely ground flour, etc., cured or uncured, oven or air-dried, as desired. Ammonium, alkaline earth metal, or alkali metal phenolate may be used, for example, sodium phenolate, potassium phenolate, barium phenolate, sodium-ortho-cresolate, barium-ortho-cresolate, potassium-para-cresolate, sodium xylenolate, ammonium-4-chloro-phenolate, calcium - 2 - chloro-phenolate, sodium - tertiary - butyl - phenolate, potassium-chloro-cresolates, and water-soluble metal salts of technical cresylic acid and wood distillate mixtures. The alkali employed in the digestion liquor is preferably an alkali metal hydroxide such as sodium hydroxide or potassium hydroxide, although ammonium hydroxide may be employed. Substantially any aldehyde, e. g. acetaldehyde, formaldehyde, butyraldehyde, benzaldehyde, salicylaldehyde, furfuraldehyde, and the like can be employed in the condensation reaction. Any water-soluble organic or inorganic acid is suitable for use in the optional partial neutralization of the digestion liquor or in the acidification of the aldehyde condensation product, e. g. sulphuric acid, hydrochloric acid, nitric acid, boric acid, acetic acid, formic acid, and the like. Acid salts, such as aluminum sulphate, zinc chloride, ammonium sulphate, copper nitrate, etc., may be substituted for the free acid.

The thermo-setting and water-insoluble condensation product obtained according to the above-described procedure can be molded at suitable temperatures and pressures to produce an infusible resin having desirable properties. However, it is generally advantageous to incorporate fillers or other modifying agents therewith before molding. The filler may be suspended in the liquor in the condensation step and before acidification whereby, upon acidifying, the condensation product is precipitated thereon; or such filler may be incorporated with the thermo-setting condensation product after precipitation along with other modifying agents such as pigments, dyes, plasticizers, lubricants, and the like.

Among the fillers suitable for use are inert fibrous materials or finely divided mineral substances, such as asbestos fiber, wood flour, sawdust, cotton flock, rubber dust, sisal hemp fibers, cellulose fiber, diatomaceous earth, bentonite, sand, mica, graphite, etc. Other modifying agents include calcium stearate, tung oil, natural resins, inorganic pigments, organic dyes, and the like. If a slightly alkaline molding composition is desired, calcium hydroxide or other suitable inorganic alkali may be incorporated with the dried condensation product.

While the temperatures and pressures required for molding the thermo-setting material vary with the particular reactants and the amounts thereof employed and the conditions of temperature and pressure prevailing during the reaction, temperatures of approximately 140-160° C. and a pressure of about 2000 pounds per square inch have been found satisfactory in most instances for molding the compositions produced, such molding operations having a cycle of 3 to 5 minutes or more, depending upon the size of the article fabricated.

The products prepared, as described above, are substantially insoluble in both hot and cold alcohol and most other common organic solvents; not decomposed, hydrolyzed, or appreciably swelled by prolonged exposure to water or sulphuric acid; substantially odorless; bond well with and are non-corrosive to metals; have a high heat resistance; can be exposed to elevated temperatures without charring, discoloring, or becoming brittle; and have good dielectric properties and high mechanical strength.

The following examples illustrate certain embodiments of the invention, but are not to be construed as limiting the same:

*Example 1*

5 pounds of oven-dried aspen hog chips having a particle size of between 15 and 50 screen mesh was digested under pressure in a solution of 9.2 pounds of sodium phenolate and 3.5 pounds of sodium hydroxide in 45 pounds of water at 180° C. for 4.5 hours. At the end of this time substantially the entire cellulosic content of the wood was dissolved in the treating fluid. The reaction mixture was then cooled to 40° C. and 9.6 pounds of 32 per cent hydrochloric acid added thereto with stirring over a period of about 5 minutes. 14.5 pounds of 40 per cent formaldehyde solution was thereafter mixed with the partially acidified digestion product and the temperature thereof raised to and maintained at 100° C. for about 50 minutes to condense the formalin with the phenolate-ligno-cellulosic complex. The reactor and contents were then cooled to 30° C. and the pH of the mixture reduced to below 5 by the addition of 25 pounds of 20 per cent hydrochloric acid solution. The water-insoluble resin compound thereby precipitated was filtered out of the aqueous mixture, washed free of residual acid and salt with distilled water, and air-dried at 25° C. for several days. 13 pounds of a thermo-setting resin containing less than 8 per cent by weight of moisture was thereby obtained.

70 parts by weight of the above resin was intimately mixed with 30 parts of commercial wood flour, 1 part of calcium hydroxide, 2 parts of sodium stearate, and 4 parts of cadmium red (light). This composition was molded at 150° C. and 2000 pounds pressure per square inch to form ash trays and similar small articles. The molding cycle was 3 minutes. After 24 hours immersion in boiling 10 per cent sulphuric acid, a sample of the above molded material lost approximately 1.25 per cent in weight. 24 hours immersion in boiling water resulted in a weight loss of between 1 and 1.5 per cent by weight. Upon exposure to increased temperatures, the molded articles were found to be difficultly flammable and highly resistant to discoloration, charring, and embrittlement. The molded material was substantially odorless, had a tensile strength of 3450 pounds per square inch, and an impact strength of 0.9 foot pound per square inch.

*Example 2*

In a similar manner 5 pounds of oven-dried white pine hog chips was heated with a solution of 9.2 pounds of sodium phenolate and 3.5 pounds of sodium hydroxide in 45 pounds of water. The digestion mixture was subsequently condensed with formalin solution, acidified, and the precipitated products separated and dried to a moisture content of 3.6 per cent. This resin product was tested as described by Peakes in Plastic Products (March, 1934, (X, 3); and April, 1934, (X, 4)) and found to have a flow characteristic of 0.18 inch at 500 pounds per square inch and 150° C. in 35 seconds. Test blanks of the above product were molded as described in Example 1, weighed and measured, and immersed in boiling 40 per cent sulphuric acid for 6 hours. The loss in weight and swelling resulting from this treatment were 2.5 and 0.76 per cent, respectively. After 24 hours immersion in boiling 10 per cent sulphuric acid, the swelling was only 0.42 per cent. 24 hours immersion in boiling water reduced the weight of test samples 1.85 per cent and resulted in 0.73 per cent swelling. In each instance, the sample subjected to the acid or water treatment was not embrittled, visibly digested, or otherwise affected by the treatment. The impact strength of freshly molded plates was 0.54 foot pound per square inch. The tensile strength was approximately 2388 pounds per square inch.

*Example 3*

5 pounds of oven-dried aspen hog chips (15–50 screen mesh) was suspended in a solution of 6.55 pounds of sodium cresolate and 3.5 pounds of sodium hydroxide in 45 pounds of water. The mixture was heated under pressure to 180° C. for 4.5 hours with agitation, at the end of which time the cellulose content of the chips was substantially completely digested in the treating liquor. The mixture was then cooled to 40° C. and partially acidified with 9.6 pounds of 32 per cent hydrochloric acid. The partially neutralized digestion product was heated to 100° C. for 65 minutes with 9.65 pounds of a 40 per cent by volume formalin solution. The condensation mixture was cooled at 30° C. and poured into 12 pounds of 20 per cent hydrochloric acid with agitation. The resulting water-insoluble resin precipitate was filtered from the dilute acid solution, washed with distilled water to remove traces of residual acid and salt, and dried at 25° C. to a moisture content of about 6 per cent by weight. Approximately 9 pounds of a finely divided light brown thermo-setting resin product was thereby obtained.

A mixture of 70 parts by weight of the above resin, 30 parts of commercial rubber dust, 1 part of calcium hydroxide, 2 parts of sodium stearate, and 4 parts of carbon black was molded at 150° C. and under 2000 pounds pressure per square inch to form a battery top. Test blanks cut from this article and immersed in an alternately charged and discharged sulphuric acid cell were substantially unaffected after 109 days at temperatures ranging up to 50° C. After 6 hours immersion in boiling 40 per cent sulphuric acid, the weight loss of the molded article was approximately 2 per cent. 24 hours immersion in boiling 10 per cent sulphuric acid caused a weight loss of only 1.6 per cent. After 24 hours immersion in boiling water, test pieces of the molded resin were found to have decreased by 1.7 per cent in weight. The dielectric breakdown value of 4-inch discs of the material 0.132–0.142 inch in thickness, as determined under standard A. S. T. M. conditions, was 340 volts per mil. The dielectric fatigue value for a similar sample was 290 volts per mil per minute. The molded resin was substantially odorless, hard, glossy, and black in nature, had a density of approximately 1.3, and a tensile strength of 2700 pounds per square inch.

*Example 4*

5 pounds of oven-dried aspen hog chips was digested substantially as described in Example 1 with 11.5 pounds of sodium xylenolate and 3.5 pounds of sodium hydroxide in 45 pounds of water at 180° C. for 4.5 hours. The mixture was then cooled to 40° C., the sodium hydroxide neutralized, 14.5 pounds of 40 per cent formalin added thereto, and heated to 95°–100° C. for 45 minutes. The aqueous condensation product was then cooled to 30° C., 5.5 pounds of asbestos fiber mixed therewith, and the mixture acidified with dilute hydrochloric acid solution. The resulting resin-impregnated fiber was filtered, washed, and dried, whereby there was obtained 18.0 pounds of a finely divided, light brown, filled resin product, having a moisture content of approximately 7.5 per cent by weight.

A mixture of 98 parts by weight of the above thermo-setting filled resin, 2 parts of sodium stearate lubricant, and 1 part of calcium hydroxide was molded substantially as described in the foregoing examples. The molded product was odorless, hard, and glossy in nature, and had an impact strength of 0.64 foot pound per square inch. After 24 hours immersion in boiling 95 per cent ethyl alcohol, test pieces of this molded product showed a reduction in weight of between 1.5 and 2 per cent and a swelling of 0.6 per cent.

Thin strips of the molded product were immersed in 75 per cent ethyl alcohol for 3 weeks at a temperature of 25° C. and sustained a weight loss of less than 1.37 per cent. The surface resistance of the resin to the solvent action of the alcohol is excellent.

Example 5

A hardwood distillate oil comprising 50-70 per cent by weight of mono- and polyhydric phenols and alkylated and ether derivatives thereof was extracted with dilute sodium hydroxide solution. 5 pounds of oven-dried aspen wood sawdust was reacted with a mixture of 55 pounds of this extract containing 6.8 pounds of phenols in the form of their sodium salts, 25 pounds of 14 per cent sodium phenolate solution, and 3.5 pounds of flaked sodium hydroxide. The mixture was agitated and heated under pressure at 180° C. for 11 hours, at the end of which time the wood was substantially completely dissolved in the treating liquor. The reactor and contents were then cooled to 50°-80° C. and the mixture partially neutralized with 8.25 pounds of 32 per cent hydrochloric acid. 14.5 pounds of a 40 per cent formaldehyde solution was added to the partially neutralized digestion liquor, and the temperature of the mixture raised to 100° C. for 45 minutes. The aqueous condensation product was then cooled to 30° C. and poured into 25 pounds of a 20 per cent hydrochloric acid solution, whereby a finely divided resin product was precipitated. This material was separated by filtration, washed with water until free of residual acid and salt, and dried to a moisture content of below 8 per cent, whereby there was obtained 12.5 pounds of a finely divided brown thermo-setting resin.

70 parts by weight of the above product was intimately mixed with 30 parts of sand, 1 part of calcium hydroxide, 2 parts of sodium stearate, and 4 parts of zinc chromate, and molded at 150° C., and under 2000 pounds pressure per square inch. Molded discs of this material, 4 inches in diameter and 0.132-0.142 inch in thickness, were found to have a dielectric breakdown value of 320 volts per mil. After 48 hours immersion in water, the dielectric breakdown was 270 volts per mil. The dielectric fatigue of the freshly molded discs was 265 volts per mil per minute. Articles, as obtained above, were substantially odorless, hard, glossy, and relatively insoluble in hot and cold alcohol and other common organic solvents.

Example 6

A solution was prepared by dissolving 9.1 pounds of sodium phenolate and 3.25 pounds of sodium hydroxide in 45 pounds of water. 5 pounds of oven-dried sawdust was added thereto and the mixture was successively heated under pressure for 6 hours at 175° C., cooled to approximately 40° C., and partially neutralized with 8 pounds of 32 per cent hydrochloric acid. 14.5 pounds of 40 per cent formaldehyde was then added to the digestion solution, condensation carried out by heating and stirring the mixture at 95°-105° C. for 45 minutes, and the resulting aqueous product cooled to 40° C.

1 pound of paper pulp was beaten in 50 pounds of water in a Niagara beater for 15 minutes, whereby the fibers of the pulp were moderately hydrated, and 2.5 pounds of a size containing 2 per cent wood rosin mixed therewith. 600 milliliters of the aqueous condensation mixture, as prepared above, was then added to the pulp-size mixture and agitated therewith for an additional 10 minutes. The mixture was then acidified with 30 per cent hydrochloric acid to a pH below 5 to precipitate a thermo-set resin on the pulp. The suspended filled resin product was then formed into pulp sheets by standard paper making methods and these sheets dried at 25° C. until their moisture content was below 8 per cent. Several thicknesses of the dried sheets were molded together at a temperature of 150°-165° C. and under a pressure of 2000 pounds per square inch to form a readily machinable board in which the thermo-set resin and fibers were bound together in a homogeneous composition. This board was infusible, hard, dense, unaffected by heat, and impervious to moisture, sulphuric acid, and common organic solvents.

Other modes of applying the principle of our invention may be employed instead of those explained, change being made as regards the products and methods herein disclosed, provided the compositions or steps stated by any of the following claims or the equivalent of such stated compositions or steps be employed.

We therefore particularly point out and distinctly claim as our invention:

1. A process for preparing an acid-resistant thermo-setting resin which comprises the steps of digesting ligno-cellulosic material in a hot aqueous solution of an inorganic alkali and a water-soluble metal salt of a phenol until the cellulose content of the ligno-cellulosic body is substantially completely dissolved in the treating liquor, adding an aldehyde to the digested mixture, heating the mixture for a period of time sufficient to cause reaction of the aldehyde with the digestion product but insufficient to cause precipitation, acidifying the aqueous product to cause precipitation of the resin, and separating the precipitate.

2. A process for preparing an acid-resistant thermo-setting resin which comprises the steps of digesting ligno-cellulosic material in a hot aqueous solution of an alkali metal hydroxide and a water-soluble alkali metal salt of a phenol until the cellulose content of the ligno-cellulosic body is substantially completely dissolved in the treating liquor, adding an aldehyde to the digested mixture, heating the mixture for a period of time sufficient to cause reaction of the aldehyde with the digestion product but insufficient to cause precipitation, suspending a filler in the liquid aldehyde condensation product, acidifying the resulting mixture whereby a resin material is deposited on the filler, and separating the solid constituents of the mixture.

3. A process for the production of an acid-resistant thermo-setting resin which comprises the steps of digesting ligno-cellulosic material in a hot aqueous solution of an alkali metal hydroxide and a water-soluble alkali metal salt of a phenol until the cellulose content of the ligno-cellulosic body is substantially completely dissolved in the treating liquor, neutralizing the inorganic alkali, adding an aldehyde to the partially neutralized digested mixture, heating the mixture for a period of time sufficient to cause reaction of the aldehyde with the digestion product but insufficient to cause precipitation, precipitating a solid resin product therefrom by acidification, and separating the precipitate.

4. A process for the production of an acid-resistant thermo-setting resin which comprises the steps of digesting ligno-cellulosic material in a hot aqueous solution of an alkali metal hydroxide and a water-soluble alkali metal salt of phenol until the cellulose content of the ligno-cellulosic body is substantially completely dissolved in the treating liquor, adding formaldehyde to the digested mixture, heating the mixture for a period of time sufficient to cause reaction of the formaldehyde with the digestion product but insufficient to cause precipitation, precipitating the solid resin from the condensation product by acidification, and separating the precipitate.

5. The process of forming an acid-resistant thermo-set resin which comprises the steps of digesting ligno-cellulosic material in a hot aqueous solution of an alkali metal hydroxide and a water-soluble alkali metal salt of a phenol until the cellulose content of the ligno-cellulosic body is substantially completely dissolved in the treating liquor, adding an aldehyde to the digested mixture, heating the mixture for a period of time sufficient to cause reaction of the aldehyde with the digestion product but insufficient to cause precipitation, precipitating a solid resin product from the condensation mixture by acidification, separating the precipitate, washing and drying the same, mixing a finely divided filler with the dried product, and molding the resulting composition under heat and pressure.

6. A thermo-setting resin adapted to be molded into articles characterized by their resistance to hydrolysis, swelling, and decomposition on contact with sulphuric acid and water, obtained by digesting ligno-cellulosic material in a hot aqueous solution of an alkali metal hydroxide and a water-soluble metal salt of a phenol until the ligno-cellulosic body is substantially completely dissolved in the treating liquor, adding an aldehyde to the digested mixture, heating the mixture for a period of time sufficient to cause reaction of the aldehyde with the digestion product but insufficient to cause precipitation, acidifying the condensation product to cause precipitation of the resin, and separating and drying the precipitate.

7. A thermo-setting resin adapted to be molded into infusible bodies characterized by their resistance to hydrolysis, swelling, and decomposition on contact with sulphuric acid and water, obtained by digesting ligno-cellulosic material in a hot aqueous solution of an alkali metal hydroxide and a water-soluble metal salt of a phenol until the ligno-cellulosic body is substantially completely dissolved in the treating liquor, adding an aldehyde to the digested mixture, heating the mixture for a period of time sufficient to cause reaction of the aldehyde with the digestion product but insufficient to cause precipitation, suspending a filler in the condensation product, acidifying the mixture to precipitate a resin upon the filler, and separating and drying the resulting solid resin product.

8. A thermo-set resin composition obtained by molding the product defined by claim 6 under heat and pressure, and characterized by its high resistance to decomposition by heat, good dielectric properties, insolubility in alcohol, and resistance to hydrolysis, swelling, and decomposition on prolonged contact with sulphuric acid and water.

9. A thermo-set resin composition obtained by molding the product defined by claim 7 under heat and pressure, and characterized by its high resistance to decomposition by heat, good dielectric properties, insolubility in alcohol, and resistance to hydrolysis, swelling, and decomposition on prolonged contact with sulphuric acid and water.

WILLIAM R. COLLINGS.
RICHARD D. FREEMAN.
RICHARD M. UPRIGHT.